United States Patent [19]
Taft

[11] Patent Number: 5,342,423
[45] Date of Patent: Aug. 30, 1994

[54] AIR FILTER FOR AN HVAC SYSTEM AND METHOD OF MANUFACTURING SAME

[76] Inventor: Andrew A. Taft, P.O. Box 1583, Houston, Tex. 77251

[21] Appl. No.: 24,309

[22] Filed: Mar. 1, 1993

[51] Int. Cl.⁵ .............................................. B01D 46/02
[52] U.S. Cl. ........................................ 55/483; 55/485; 55/492; 55/493; 55/495; 55/511; 55/528; 55/DIG. 31
[58] Field of Search ................. 55/213, 483, 485, 492, 55/493, 495, 502, 511, 513, 516, 525, 528, DIG. 31

[56] References Cited

U.S. PATENT DOCUMENTS

| | | | |
|---|---|---|---|
| 3,142,550 | 7/1964 | Kuehne | 55/495 |
| 3,280,538 | 10/1966 | Schwarz | 55/502 X |
| 3,373,546 | 3/1968 | Setnan | 55/511 X |
| 4,786,295 | 11/1988 | Newman et al. | 55/213 |
| 4,855,047 | 8/1989 | Firth | 55/502 X |
| 5,037,455 | 8/1991 | Scheineson et al. | 55/485 X |
| 5,059,218 | 10/1991 | Pick | 55/511 X |
| 5,182,542 | 1/1993 | Adelman et al. | 55/213 X |
| 5,196,040 | 3/1993 | Malloy et al. | 55/511 X |

Primary Examiner—Charles Hart
Attorney, Agent, or Firm—Harrison & Egbert

[57] ABSTRACT

An air filter apparatus for an HVAC system having a frame with a channel area formed therein and having legs extending into the channel area, and a filter material having a portion received within the channel area. The filter material extends across the frame. The legs of the frame extend so as to exert a compressive force on the edges of the filter material received therebetween. The filter material has a first flexible mesh layer, a fibrous layer, and a second flexible mesh layer formed in a sandwiched configuration. The frame has a T-shaped slot extending longitudinally along an outer surface of the frame. The frame also has a notch formed along a corner of the frame and extends around the frame. A bead of an elastomeric material is received within this notch so as to extend outwardly of the frame.

9 Claims, 3 Drawing Sheets

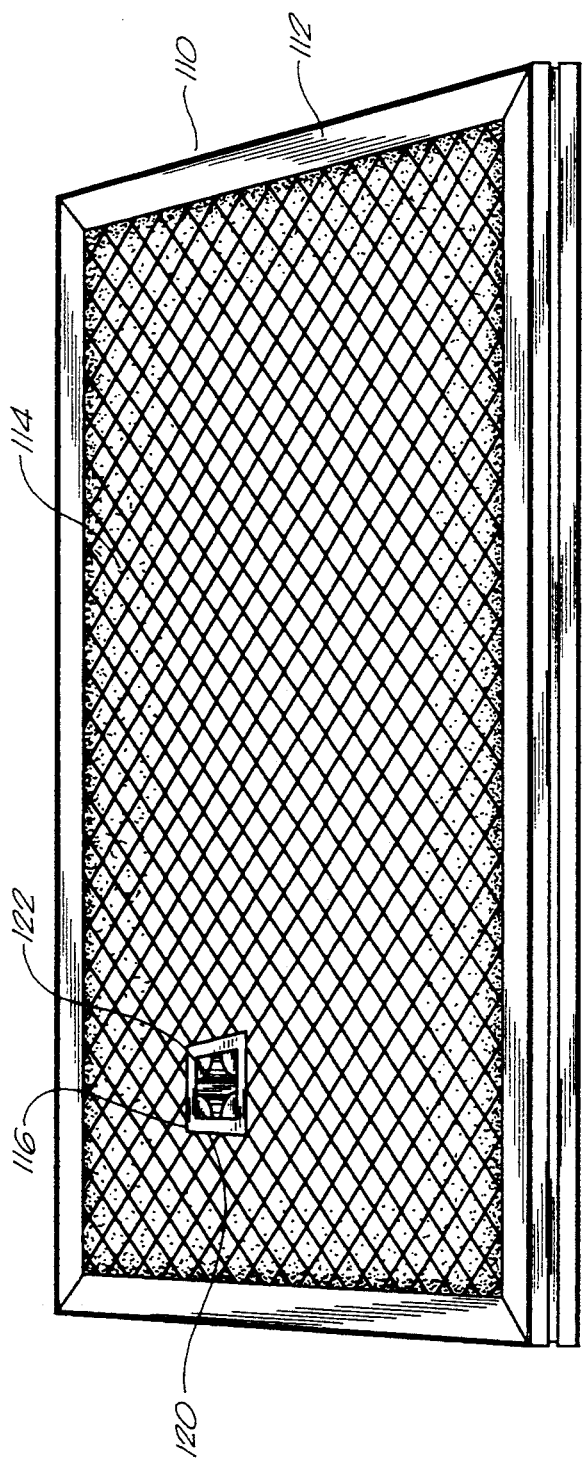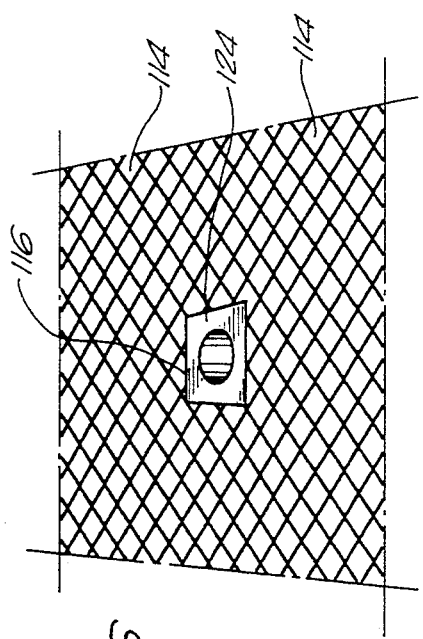
FIG. 5
FIG. 6

AIR FILTER FOR AN HVAC SYSTEM AND METHOD OF MANUFACTURING SAME

TECHNICAL FIELD

The present invention relates to air filters, in general. Additionally, the present invention relates to methods and apparatus for the manufacture of air filters for heating, ventilation, and air conditioning systems ("HVAC systems").

BACKGROUND ART

Throw-away type air filters have been on the market for many years. These throw-away air filters have been made for both consumer and commercial use in HVAC systems. These inexpensive filters provide protection mainly for the HVAC system itself. These filters are provided so that large objects are captured before they cause damage to the fan motor and other components. In general, these low-efficiency filters were not intended to capture smaller particles of dust, pollen and mold that pass through to the indoor environment.

A very large number of permanent-type air filters have recently entered the market. These permanent type filters are generally made of a rigid aluminum frame. The filter material is received between two walls of expanded metal material. The filter material is made of a very pliable material having little or no interior strength. The expanded metal material can be used to form a honeycomb shape around the filter material. The expanded metal is used to support the filter material within the frame.

As an example, an "electrostatic" air filter is the subject of U.S. Pat. No. 4,902,306, issued on Feb. 20, 1990, to Burnett et al. This patent describes a filter which uses alternating layers of charged materials. Typically, these layers are in the form of woven polypropylene screens. This filter has some type of expanded metal or galvanized wire mesh on both sides. This expanded metal serves to support the interior filtering materials and to keep them contained within the rigid aluminum or plastic frames. The subject matter of this patent is typical of the various permanent-type filters which are presently on the market. Unfortunately, these permanent-type filters have several disadvantages.

Initially, these types of permanent-type filters have a high unit cost. This is due to the use of the relatively expensive items such as the woven polypropylene mesh and the expanded metals. Unfortunately, it is necessary that such materials be used in these air filters since the frames, themselves, are of a relatively weak nature. The frames do not have any means for holding the material in the frame directly. Without the expanded metal containment surfaces, the filtering materials would quickly and easily fall out of position from within the frame.

Another disadvantage is that the outer layers, particularly those of expanded metals, are abrasive to the hands. If it is necessary to remove the filter, these surfaces can scrape or cut. In general, the filter must be handled in a delicate fashion so as to accomplish the necessary periodic cleaning of the filter.

These permanent-type filters have no means with which to lock the layers of the filtering material within the frame. All of these frames rely on the strength of the various layers so that all of the materials stay within the frame. However, the filtering materials, in all of these systems, are normally some type of polyester fiber or foam. These materials can easily sag down over a period of time from the weight of the water which is used to clean the filter. If the polyester material (or other layers of material) does sag within the frame, then there will be a significant gap between the filter media and the frame, through which unfiltered dust and contaminants will flow past the filter.

The frames which are used for the conventional types of permanent-type filters are usually made of an aluminum material. When this aluminum frame is inserted within the housing of the HVAC system, then a significant amount of vibration can occur. Any annoying noises which a permanent-type filter would cause, when installed, would quickly dissuade persons from using such systems. In addition, such vibration can cause the dirt contained in the filter to be discharged into the plenum.

The frames which are used on permanent-type air filters do not usually have any means for an air-tight seal in that area where the frame meets the filter housing of the HVAC system. Without an air-tight seal, the air can pass around the frame and into the air plenum. Wherever the air can pass freely, it will allow a significant amount of dust or other contaminants to flow around the frame and filtering materials (which were intended to capture these particles).

As such, it is an object of the present invention to provide an air filter that is of relatively low cost.

It is another object of the present invention to provide an air filter which avoids the use of expanded metal support surfaces.

It is a further object of the present invention to provide an air filter which effectively retains the filter material in its proper position within the frame.

It is still a further object of the present invention to provide a vibration-resistant frame.

It is another object of the present invention to provide a frame which effectively creates an air-tight seal between the frame and the filter housing.

These and other objects and advantages of the present invention will become apparent from a reading of the attached specification and appended claims.

SUMMARY OF THE INVENTION

The present invention is an air filter apparatus for an HVAC system that comprises a frame having a channel area formed therein and having legs extending inwardly into the channel area, and a filter material having a portion received within the channel area. The filter material extends across the frame. The filter material is of a flexible fibrous material. An inventive feature of the present invention is the use of the legs of the frame which extend so as to exert a compressive force on the portion of the filter material so as to retain the sheets of filter material and protective mesh within the channels of the frame.

The frame has a generally rectangular configuration. The filter material extends across this rectangular configuration. The frame is comprised of a plurality of extruded aluminum members. These aluminum members are interconnected together by welds or a plurality of fasteners. The channel has a plurality of thread-receiving areas formed therein, as well as a slot for insertion of a bracket. The fasteners are threaded members which are received by these thread-receiving areas. The fasteners are generally positioned adjacent to the corners of the frame so as to secure the corners of the extruded aluminum members together.

The frame has a T-shaped slot formed on an outer surface of the frame. This T-shaped slot extends along at least a portion of the frame and extends longitudinally along at least one of the channel members. The frame also includes a notch formed along an outer corner of the frame. This notch extends around the frame. The notch serves to receive a bead of elastomeric material, such as silicone. The elastomeric material extends outwardly beyond the surfaces of the frame. The bead of elastomeric material is received in the notch. When dry, the bead forms a mechanical bond with the notch so that the bead remains attached to the frame.

The frame has a generally U-shaped cross-section. The channel is formed within this U-shaped cross-section. The legs extend inwardly from each of the outer ends of the U-shaped cross-section. Each of the legs has an abutment surface formed on an inward end of the legs. This abutment surface is in contact with the filter material.

The filter material includes a first flexible mesh layer received within the channel and extending across the frame, a fibrous layer juxtaposed against the first flexible mesh layer for filtering air passing therethrough, and a second flexible mesh layer received within the channel and extending across the frame on the opposite side of the fibrous layer from the first flexible mesh layer. The first and second flexible mesh layers are made of an extruded polymeric material. The fibrous layer is made of a polyester material.

The method of the present invention comprises the steps of: (1) forming at least a portion of a frame of a plurality of channel members; (2) inserting a filter material within this portion of the frame such that the edges of the filter material are received within the side walls of the channel members; and (3) compressing the outwardly extending side walls such that interior legs of the side walls compressively engage the filter material.

The step of forming the frame comprises the steps of: (1) positioning e first channel member adjacent an end of a second channel member in transverse relationship therewith; (2) fastening the first channel member to the second channel member; (3) positioning a third channel member adjacent to an opposite end of the second channel member in transverse relationship therewith, and (4) fastening the third channel member to the second channel member.

The step of inserting further includes the step of sandwiching a layer of polyester material between layers of extruded polymeric mesh material so as to form the filter material. The step of compressing includes positioning the assembled frame onto a die press, actuating the die press so as to compress the side walls of the frame so as to be in parallel relationship, and removing the frame from the die press.

BRIEF DESCRIPTION OF THE DRAWINGS

FIG. 5 is a perspective view of an alternative embodiment of the present invention.

FIG. 6 is a rearward detailed view of the noise maker as used in the alternative embodiment of the present invention.

DETAILED DESCRIPTION OF THE INVENTION

Figure 1:
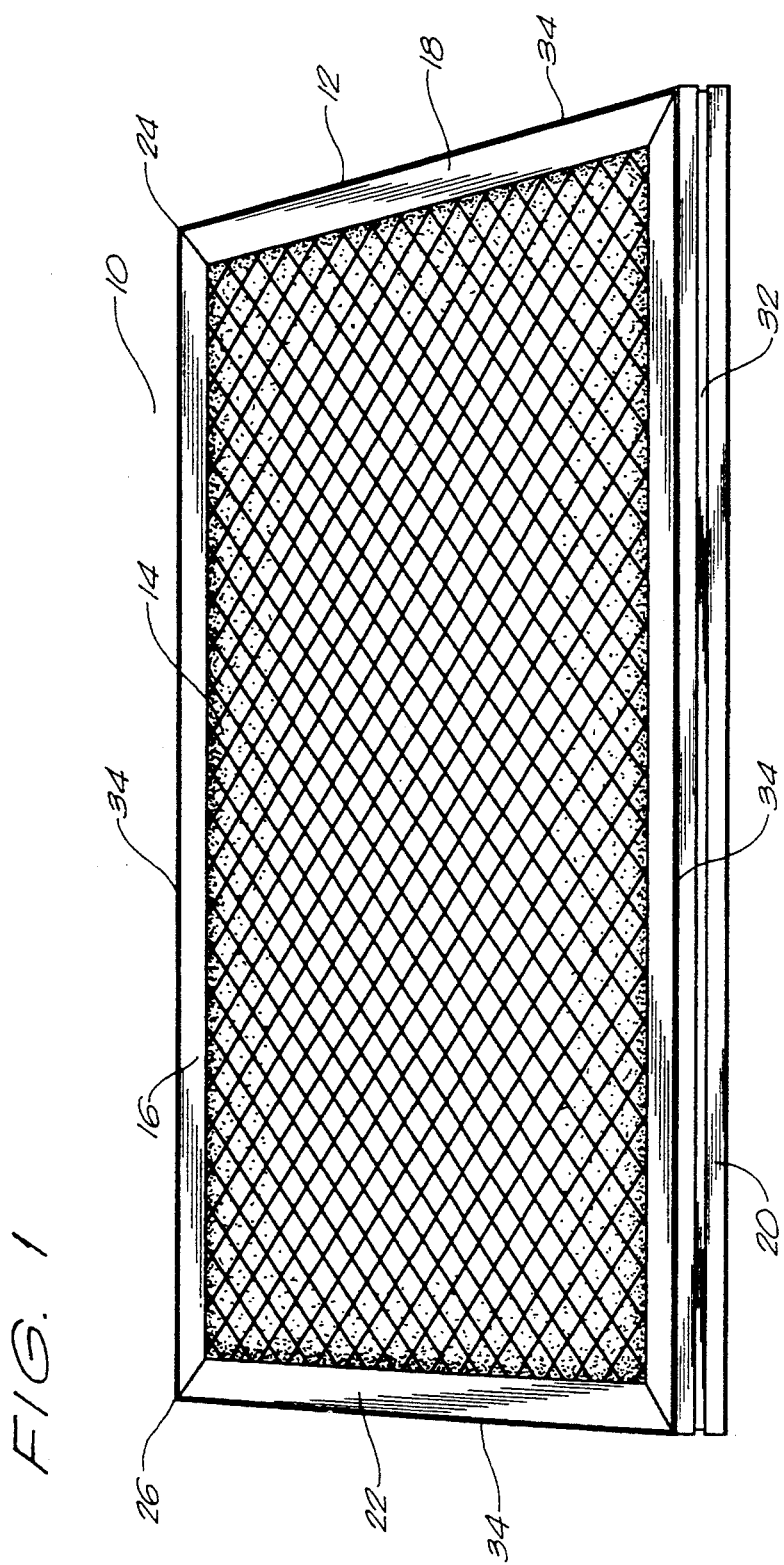
FIG. 1 is a perspective view of the air filter apparatus in accordance with the preferred embodiment of the present invention.

Referring to FIG. 1, there is shown at 10 the air filter apparatus in accordance with the preferred embodiment of the present invention. The air filter apparatus 10 includes a frame 12 and filter material 14. The frame 12 serves to receive the filter material 14 therein. It can be seen that the filter material 14 extends within the interior area of the frame 12. Each of the outer edges (not shown) of the filter material 14 is compressively received between legs formed on the interior of the frame 12.

The frame 12 is comprised of channel member 16, channel member 18, channel member 20, and channel member 22. Each of these channel members is joined together at their respective ends. As can be seen, channel member 16 is joined at end 24 to one end of the channel member 18. Channel member 16 is also joined at its other end 26 to an end of the channel member 22. The channel member 18 is joined, at its other end, to channel member 20. Similarly, channel member 22 is joined, at its other end, to channel member 20. The joining of the channel members 16, 18, 20 and 22 forms a generally rectangular configuration. The specific size of the rectangular configuration formed by frame 12 will be dependent upon the requirements of the HVAC system into which it is to be used.

Channel member 20 illustrates some important features of the present invention. First, channel member 20 is joined at one end to the channel member 18 by fasteners, screws, or by welding. Similarly, the other end of the channel member 20 is joined to the channel member 22. In general, each of the other connections between the channel members is accomplished in a similar fashion. However, for the purposes of the present invention, the channel members can be joined together by a variety of methods, including fasteners, adhesives, welding, screws, clips or other items.

Another feature illustrated in FIG. 1 in connection with channel member 20 is the use of the T-shaped slot 32 which extends longitudinally along the outer surface of the channel member 20. T-shaped slot 32 is formed so as to allow the air filter 10 to receive hooks or other items for retail display. The T-shaped slot 32 can also receive brackets or "spring clips" for the purpose of joining the channel members together. The T-shaped slot 32 can also be used so as to facilitate installation in an HVAC system.

It can be seen in FIG. 1 that a bead 34 of elastomeric material, such as silicone, extends around the periphery of the frame 12. Bead 34 is received within a notch formed along the corner of each of the channel members 16, 18, 20, and 22 (to be described hereinafter). The bead 34 extends outwardly of the frame 12 so as to provide an anti-vibration surface and also to provide additional air resistance and to facilitate air-tight installation.

Figure 2:
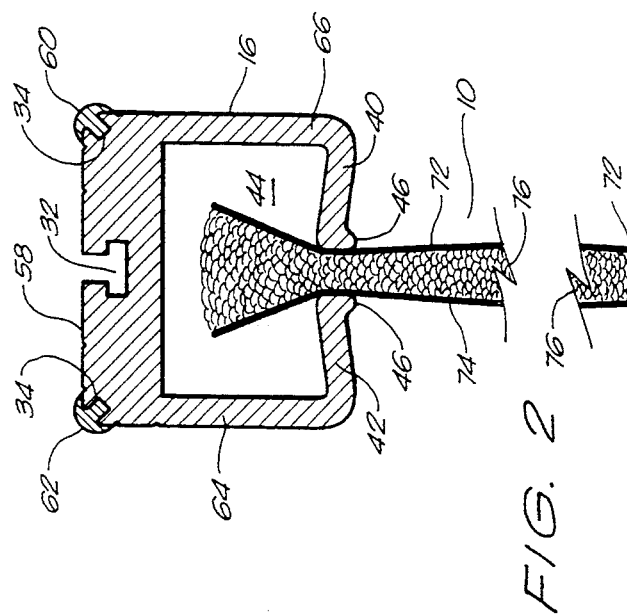
FIG. 2 is a cross-sectional view showing the relationship of the frame with the filter material.
Figure 2:
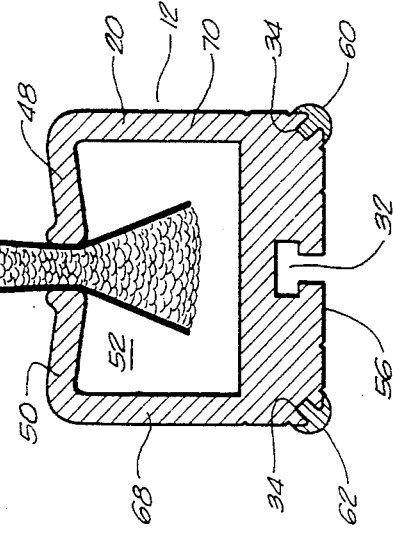

FIG. 2 is a cross-sectional view of the air filter 10 of FIG. 1. In FIG. 2, it can be seen that the frame 12 is illustrated by channel members 16 and 20. Additionally, the filter material 14 is illustrated as extending between each of the channel members 16 and 20.

The frame 12 is made up of the channel members, in the manner described herein previously. An important inventive feature of the present invention is the use of legs 40 and 42. Legs 40 and 42 extend into channel area 44 on the interior of channel member 16. Each of the legs 40 and 42 exerts a compressive force on the outer surfaces of the filter material 14. During installation procedures, the legs 40 and 42 are compressed so as to engage and stretch the filter material 14 therebetween. Each of the legs 40 and 42 includes an abutment surface 46 which actually compressively engages the filter material 14. As can be seen, the channel member 20 also includes legs 48 and 50 which are in compressive engagement with the outer surface of the filter material 14. Each of the legs 48 and 50 extends into the channel area 52 of channel member 20.

Each of the channel members 16 and 20 is made of extruded aluminum material.

FIG. 2 also illustrates the manner in which the T-shaped slots 32 are formed in the channel members 16 and 20. As can be seen these T-shaped slots 32 are formed generally centrally of the outer surface 56 of channel member 20 and the outer surface 58 of channel member 16. As was seen in conjunction with FIG. 1, the T-shaped slots 32 extend longitudinally along these outer surfaces 56 and 58 so as to provide a continuous outer surface for the receipt of peg-hooks and other items. These T-shaped slots 32 serve several purposes. Initially, it allows support for the frame pieces during the manufacturing process. It also allows the insertion of corner brackets or other fasteners. These T-shaped slots 32 make it possible to hold the frame members in place while the cutting and mitering and other processes are in progress. Slots 32 can also be used to insert a hanging hook into the frame. This hook can be essential for the ability to hang the filter from a peg-hook or other vertical display in retail stores. The T-shaped slot 32 enhances the ability of the product to be displayed. Additionally, and furthermore, the T-shaped slot 32 creates a void in the central area of the outer surfaces 56 and 58 of the frame 12. This void serves the useful purpose in those common instances in which the filter housing has been installed by using either nails or driven screws. In particular instances, the slots 32 enable the frame to be installed easily in those areas where there are protruding nail heads or screw heads. As such, the slots 32 further accommodate the installation of the filter 10 of the present invention.

As was initially described in conjunction with FIG. 1, a notch 34 is formed along the outer corners of each of the channel members of the frame 12. This notch 34 is configured so as to extend around the periphery of the frame 12. Notches 34 are positioned so as to receive a bead of silicone 60 along one surface and a bead of silicone 62 along another surface. This bead of silicone can be injected into the notches 34 so as to provide a contact surface between the frame 12 and the filter housing of the HVAC system. The use of the silicone bead serves two main purposes. First, the bead ensures that no air can flow around the frame since the silicone beads will be pressed hard against the filter housing as the fan motor sucks the entire filter in the direction of the air flow. Secondly, the silicone bead is meant to serve as the primary contact point between the filter frame and the filter housing. This "rubbery" contact surface will absorb any vibrations that otherwise could easily be caused by any slight movement of the frame that would be expected to take place as the air flow puts pressure on the entire filter. The use of the silicone beads 60 and 62 further enhances the profile of the void in the center part of the outer surfaces of the filter frame 12. As was described before, this void facilitates the installation of the filter 10 of the present invention since it provides a clearance area into which nails or driven screws of the filter housing may appear.

The channel member 16 is made up of outer wall 58 and side walls 64 and 66. The leg 40 extends inwardly from the side wall 66. The leg 42 extends inwardly from the end of the side wall 64. The side walls 64 and 66, in combination with the outer wall 58 serves to define the channel area 44 therewithin. The side walls 64 and 66 are arranged in generally parallel relationship to each other.

The channel member 20 includes outer wall 56 and side walls 68 and 70. Leg 48 extends inwardly from the end of side wall 70. Leg 50 extends inwardly from the end of side wall 68. The configuration of the outer wall 56, in combination with side walls 68 and 70, define the area of channel 52. The side walls 68 and 70 are arranged in parallel relationship to each other.

In FIG. 2, it can be seen that the filter material 14 extends between the channel members 16 and 20. The filter material 14 ks made up of a first flexible mesh layer 72, a second flexible mesh layer 74, and a fibrous layer 76. The fibrous layer 76 is sandwiched between the flexible mesh layers 72 and 74. In normal use, the flexible mesh layers 72 and 74, along with the fibrous layer 76 contained therebetween, will billow out such that the thickness of the filter material 14 will be greater than the thickness of the channel members 16 and 20. The configuration of the filter material 14, as shown in FIG. 2, is merely for the purposes of illustrating the arrangement of how the legs of each of the channel members is used so as to exert compressive forces on the filter material 14.

The flexible mesh layers 72 and 74 are made of an extruded polymeric material, such as polypropylene. The fibrous material 76 is made of a polyester material, such as polyethylene terephthalate. Various other filter materials, such as foam, could be used as the fibrous layer 76. The present invention should not be limited by particular types of material identified as used as the fibrous layer 76. It is believed that various fibrous materials would serve the purposes of providing a proper filter medium. However, for the purposes of the present invention, At ks particularly desirable that the mesh layers 72 and 74 be of a relatively inexpensive flexible and porous material.

In FIG. 2, it can be seen that, because of the compressive forces exerted by the legs 40 and 42 of first channel member 16 and the compressive forces of the legs 48 and 50 of the second channel member 20, the filter material 14 is secured and is pulled taught therebetween. The particular method of assembling the filter 10 of the present invention keeps the filter material 14 generally taught and secured between the channel members 16 and 20. It should be noted that the configuration illustrated in FIG. 2 is essentially a cross-sectional view of the corresponding portion of FIG. 1. However, the illustration of FIG. 2 could, just as easily, be an illustration of a cross-section taken in a transverse direction across the air filter of FIG. 1.

Figure 3:
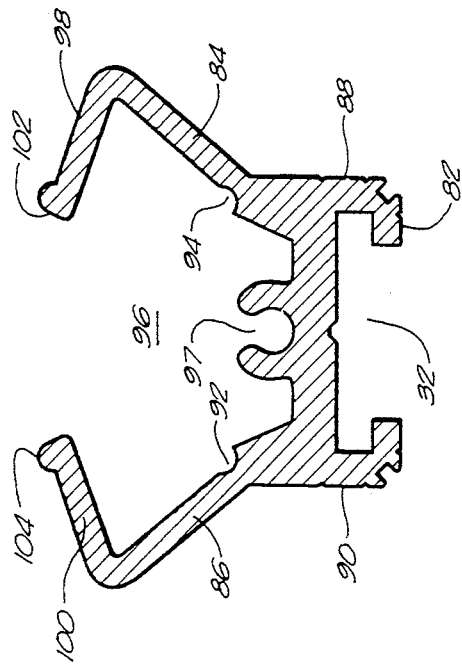
FIG. 3 is a cross-sectional view of a single channel member prior to compression.

FIG. 3 illustrates the manner in which a channel member 80 is configured prior to assembly into the form of the air filter 10 of the present invention. The aluminum frame members of the present invention are initially extruded in a shape corresponding to the shape shown in FIG. 3. As can be seen, the channel member 80 includes an outer surface 82 and outwardly extending side walls 84 and 86. These side walls 84 and 86 extend outwardly from the sides 88 and 90 of the channel member 80. Indentations 92 and 94 are formed within the channel 96 and channel member 84 and into the side walls 84 and 86 so as to facilitate the movement of the side walls 84 and 86. A receptacle 97 is provided so as to extend into the area of channel 96. The receptacle is configured to receive a screw or other fastener when the channel member 80 is assembled in the frame. The legs 98 and 100 extend inwardly into the area of channel 96. Specifically, the leg 98 extends inwardly, at an angle, from the outwardly extending side wall 84. Similarly, leg 100 extends inwardly, at an angle, from the outwardly extending side wall 86. These angles are less than 90° relative to the side walls. The leg 98 includes an abutment surface 102 formed at an end opposite the side walls 84. The leg 100 includes an abutment surface 104 formed at an end opposite the side wall 86. In this arrangement, the channel 96 forms a suitable entry area into which the filter material 14 can be inserted. During normal installation, the various layers of the filtering material 14 can easily be slid into the frame directly from an indexing and cutting machine. This can be accomplished with minimal operator involvement.

Figure 4:
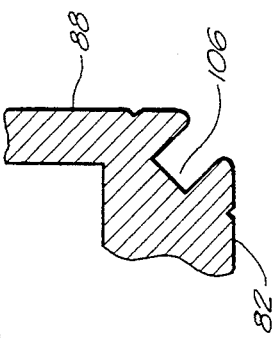
FIG. 4 is a detailed view showing the notch extending along a corner of the frame.

FIG. 4 is a detailed view showing the arrangement of a corner of the channel member 80. Specifically, the side wall 88 is integrally formed with the outer wall 82. Notch 106 has a somewhat rectangular cross-section and is formed into the corner between the side wall 88 and the outer wall 82. Notch 106 is suitable for the receipt of a bead of an elastomeric or silicone material. The configuration of the notch 106 will extend around the periphery of the frame 12 of the air filter 10 of the present invention. In the process of manufacturing the present invention, all of the layers of the filter 14 are placed inside the completed frame. After the frame has been completely assembled, and the material contained therein, the entire assembly of the frame and filter materials can be placed into a die press. The die press uses a large flat surface for the purpose of completing the present invention. The die press will compress the side walls of the frame 12 under tremendous pressure such that the side walls will be forced into a generally parallel relationship to each other. The legs, extending inwardly from the side walls, will then hold all of the filtering material layers firmly in place. The slight backward angle (less than 90°) of the legs will cause the legs to pull the layers of filter material inwardly as the legs come together in the die press. This causes the filtering mesh and interior materials to be more taught and less wrinkled on the completed product. It thus gives the product a more aesthetically pleasing appearance.

The filtering materials are firmly held in place by the compressive relationship between the legs and the filter materials. This securing of the filter material to the frame is so strong that repeated washing and/or handling of the filter will not cause the layers to become separated from the frame. This ensures that all of the air flow must go through the filter. As such, it accomplishes the removal of dust and contaminants as intended.

In normal use, the filtering material 14 may tend to billow outwardly such that the area of the filter material 14 will have a greater thickness than that of the channel members. During installation procedures, the layers of filter material will certainly be thicker than the frame. This enhances the ability of the filter materials to provide superior filtering capability. It also causes the frame/filter assembly to be firmly encapsulated within the filter housing. This is especially true in the most common applications, where there is some type of hinged door that will be closed to hold the filter inside the filter housing. Given the typical thickness of manufactured filter housings (approximately one-inch), and the total thickness of the filter material (one and a quarter inches to one and a half inches), this "pregnant" effect will thus cause the door of the filter housing to press the filter firmly up against the edge of the housing opening. In this manner, the silicone bead will make firm contact with the filter housing. This eliminates air gaps around the frame and also prevents vibration of the frame against any surface of the filter housing.

FIG. 5 shows an alternative embodiment of the air filter apparatus 110 of the present invention. It can be seen that the frame 112 has a configuration similar to that of the embodiment shown in FIG. 1. Additionally, the filter material 114 will also have a similar configuration. In FIG. 5, the important difference is the use of a noise maker apparatus 116 which is positioned, in a location displaced from center, within the filter material 114. In FIG. 6, a rearward view of the noise maker apparatus 116 as implanted within the filter material 114 is illustrated. The noise maker apparatus 116 includes an abutment surface 120 which is placed over the outer surface of the filter material 114. A rectangular opening 122 is formed so as to extend through this abutment surface 120 and to allow the passage of air therethrough. Similarly, in FIG. 6, it can be seen that the noise maker apparatus 116 includes another abutment surface 124 which is in abutment with the outer surface of the filter material 114 on the other side of the air filter 110. This arrangement allows the noise maker apparatus 116 to be secured within the air filter 110. The noise maker apparatus 116 is offset from center so that the air flow through the noise maker 116 will be unimpeded by the position of the housing into which the filter is placed.

During normal use, the blower of the HVAC system will be causing air to pass from the side shown in FIG. 5 and to exit through the side shown in FIG. 6. During normal use, air is blocked from blowing through the noise maker apparatus 116 by a spring-effect on a valve-like arrangement within the noise maker 116. However, when the filter material 114 becomes sufficiently clogged, the pressure differential will cause the valve-like apparatus of the noise maker 116 to open. When this occurs, the noise maker apparatus 116 will create a whistling noise. This whistling noise serves to alert the owner of the filter 110 that the filter has become clogged and is in need of cleaning. The ability to detect a clogged filter effectively avoids those instances where the filter becomes so clogged that the motor of the HVAC system is overloaded and damaged. It also avoids those situations where the filter is so clogged that effective cleansing of the air is no longer accomplished. The noise maker apparatus 116 provides an effective warning to the user of the air filter 110 that there is a need for cleaning.

The foregoing disclosure and description of the invention is illustrative and explanatory thereof. Various changes in the details of the illustrated construction may be made within the scope of the appended claims without departing from the true spirit of the invention. The present invention should only be limited by the following claims and their legal equivalents.

I claim:

1. An air filter apparatus for an HVAC system comprising:
   a frame having a channel area formed therein, said frame having legs extending into said channel area; and
   a filter material having a portion received within said channel area, said filter material extending across said frame, said filter material being of a flexible fibrous material, said legs of said frame extending so as to compressively engage the portion of the filter material so as to retain the filter material within the channels of the frame, said frame having a generally U-shaped cross-section, said channel area formed within said U-shaped cross-section, said legs extending inwardly from each of the outer ends of said U-shaped cross-section, each of said legs having an abutment surface formed on an inward edge of each of said legs, said abutment surface in compressive contact with said filter material.

2. The apparatus of claim 1, said frame having a rectangular configuration, said filter material extending across said rectangular configuration.

3. The apparatus of claim 2, said frame comprised of a plurality of extruded aluminum members, said aluminum members being interconnected together.

4. The apparatus of claim 1, said frame having a T-shaped slot formed along an outer surface of said frame, said T-shaped slot extending along at least a portion of said frame.

5. The apparatus of claim 1, said frame having a notch formed along an outer corner of said frame, said notch extending around said frame.

6. The apparatus of claim 5, said notch receiving a bead of an elastomeric material, said bead extending outwardly of said frame.

7. The apparatus of claim 1, said legs extending at less than a ninety degree angle with respect to said U-shaped cross-section.

8. The apparatus of claim 1, said filter material comprising:
   a first flexible mesh layer received within said channel and extending across said frame;
   a fibrous layer juxtaposed against said first flexible mesh layer, said fibrous layer for filtering air passing therethrough, said fibrous layer having an edge received within said channel, said fibrous layer extending across said frame; and
   a second flexible mesh layer received within said channel and extending across frame, said second flexible mesh layer juxtaposed against said fibrous layer opposite said first flexible mesh layer.

9. The apparatus of claim 8, said first and second flexible mesh layers being of an extruded polymeric material, said fibrous layer being of a polyester material.

* * * * *